United States Patent [19]

Miller et al.

[11] Patent Number: 5,098,564

[45] Date of Patent: Mar. 24, 1992

[54] AUTOMATIC SELF-CLEANING STRAINER ASSEMBLY

[75] Inventors: B. Glenn Miller; William C. Batten, both of Asheboro, N.C.

[73] Assignee: Thermaco, Inc., Asheboro, N.C.

[21] Appl. No.: 557,962

[22] Filed: Jul. 25, 1990

[51] Int. Cl.⁵ .......................................... B01D 33/327
[52] U.S. Cl. .................................. 210/236; 210/391; 210/396; 210/400
[58] Field of Search ................ 210/155, 161, 236, 391, 210/396, 400, 158–160; 4/290–292; 209/307, 381, 382, 385, 681; 134/104.4; 198/497, 499, 851, 853, 860.3, 861.1, 950

[56] References Cited

U.S. PATENT DOCUMENTS

| 936,162 | 10/1909 | Pringle | 209/381 |
| 1,285,448 | 11/1918 | Spooner | 210/391 |
| 1,864,359 | 6/1932 | Laughlin et al. | 210/160 |
| 2,095,504 | 10/1937 | Kesti et al. | 210/160 |

FOREIGN PATENT DOCUMENTS

| 0544535 | 2/1923 | France | 210/400 |
| 0021497 | 9/1968 | Japan | 210/155 |

Primary Examiner—W. Gary Jones
Assistant Examiner—Matthew O. Savage
Attorney, Agent, or Firm—Rhodes, Coats & Bennett

[57] ABSTRACT

A strainer assembly for separating solid particles, such as food particles, from drain water includes a straining apparatus made up of discrete portions which travel on an endless path with the path having platform and dumping segments. Incoming drain water impacts the discrete portions of the straining apparatus in the platform segment so that the solid particles are held on the discrete portions while water passes to the drain and the solid particles travel with the discrete portions to the dumping segment, where they are dumped to a collection facility.

30 Claims, 2 Drawing Sheets

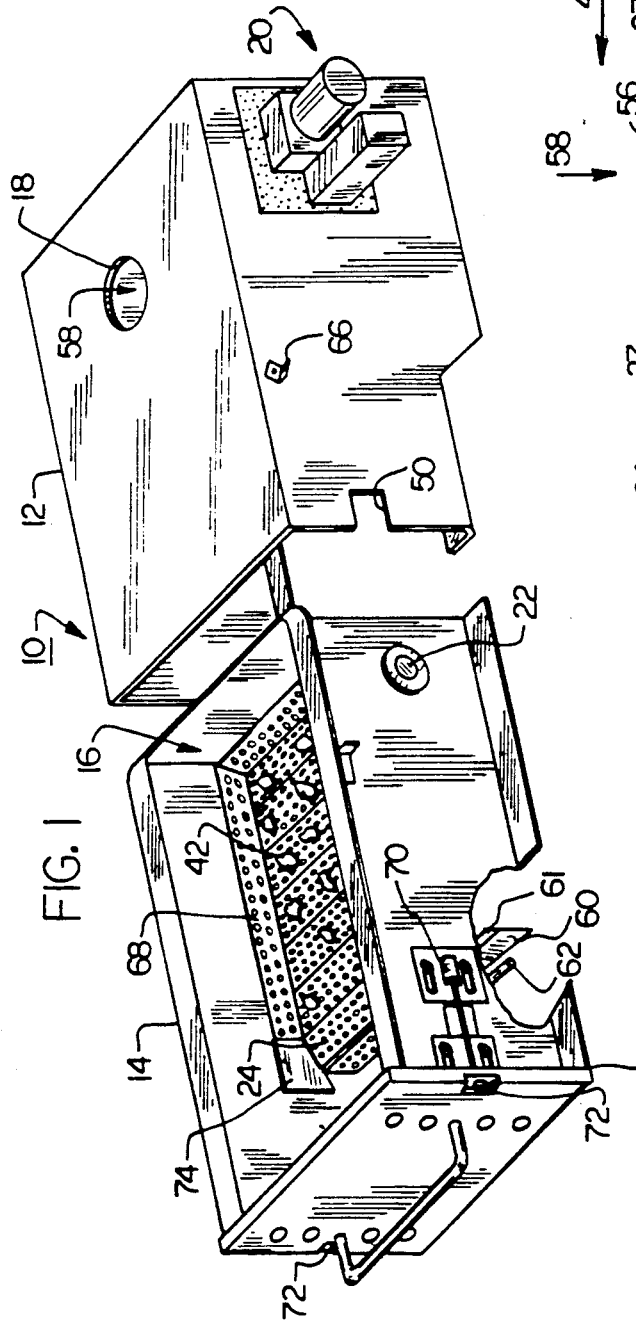
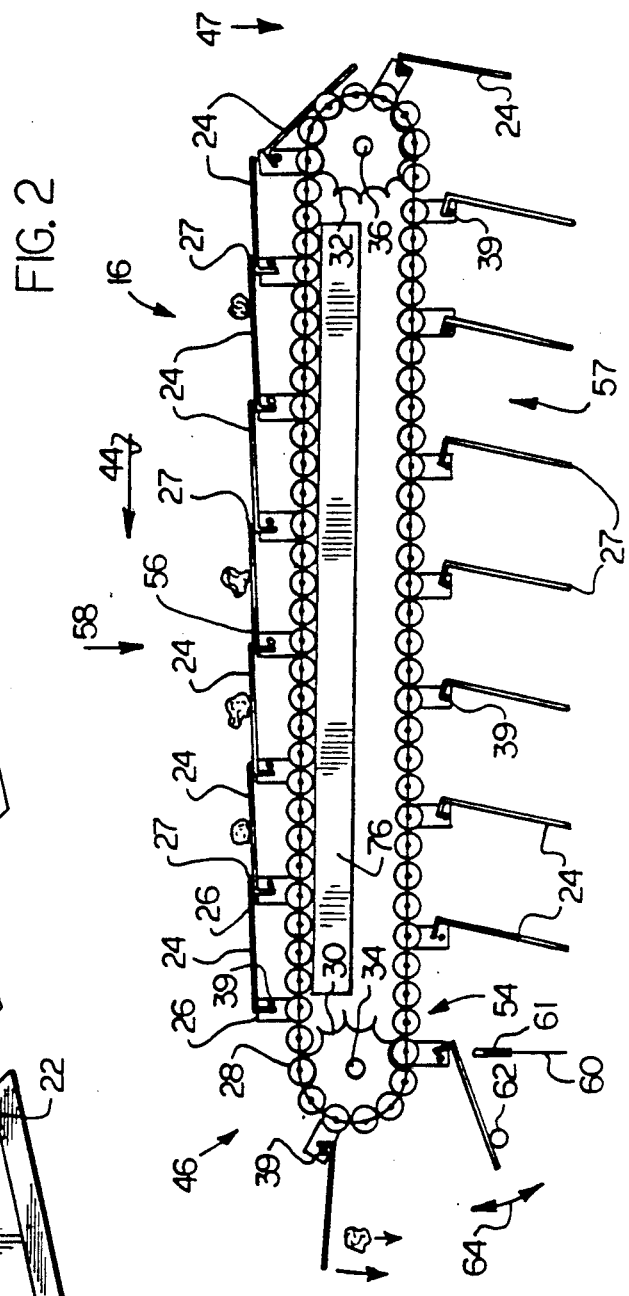

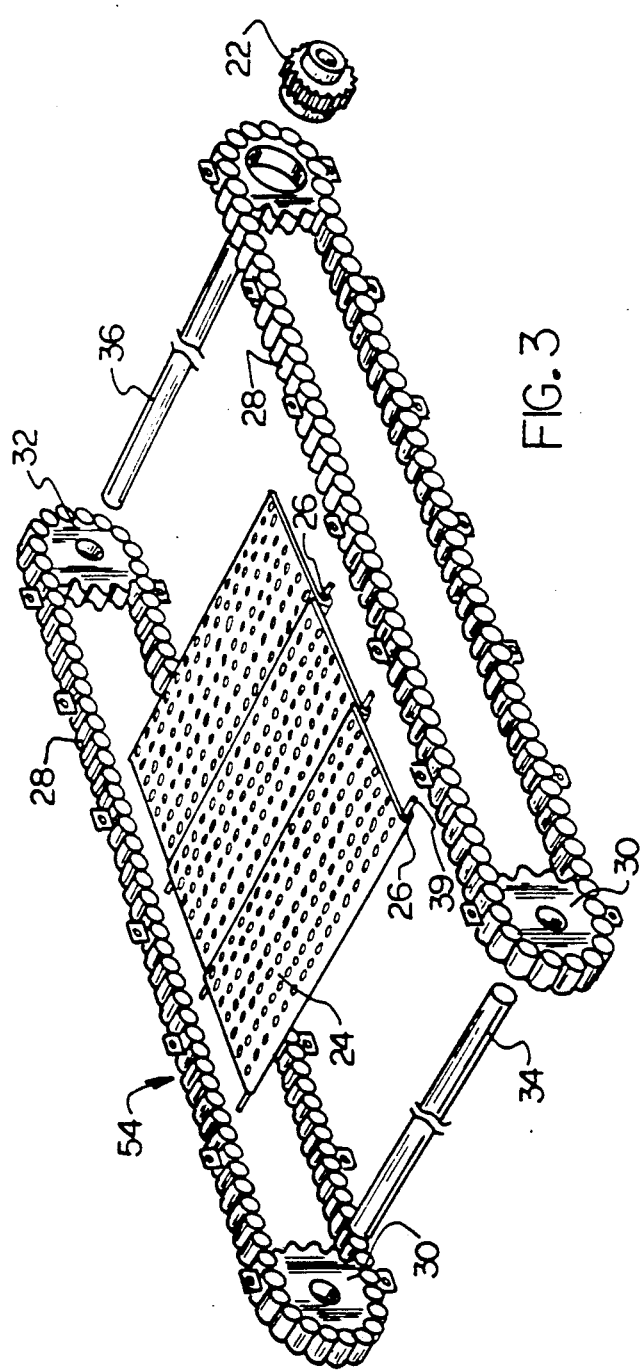

AUTOMATIC SELF-CLEANING STRAINER ASSEMBLY

BACKGROUND OF THE INVENTION

1. Field of the Invention

This invention relates to a strainer assembly structured to be automatically self-cleaning and used to separate solid particles such as food particles from drain water in an automatic fashion, thereby continuously cleaning the strainer surface, assuring a nonclogging operation of the strainer assembly. Other uses for the assembly include removal of solids from drains of forensic pathology laboratories, mortuaries or the like, or other instances where the dewatering or classification of solids is desired.

2. Description of the Prior Art

The use of various types of strainers primarily for commercial installations, such as restaurants, is known in the art, and garbage disposal units are often used in domestic as well as a certain low-volume commercial applications. Such units typically comminute the particles to a point where they will not clog the exit drain or plumbing of a sink or like facility. Certain problems with garbage disposal units are well recognized, and it is generally accepted that the garbage disposal units are not well adapted for high volume operations such as in a restaurant. In particular, the addition of large volumes of solid organic material to sewage imposes a substantial processing load on sewage treatment plants. Some communities have responded to the resulting cost increase by assessing sewage treatment surcharges to restaurants and similar establishments according to the amount of solids introduced into the sewage system by the establishment. In addition, the force required to comminute kitchen waste is great, requiring a motor on the order of 5 horsepower.

Accordingly, there is a well recognized demand for a system which provides a strainer structure specifically adapted to remove solid food particles from the drain water and direct them to a collection facility.

While numerous strainer facilities do in fact exist, one problem associated with the conventional or prior art strainer structures is their tendency to become clogged with food particles, thereby rendering them useless for efficient separation of solid particles from the drain water prior to such water exiting through conventional drain pipe facilities.

Accordingly, there is a need for a strainer assembly which separates disposed food waste or like solid particles from drain water and which is automatically self-cleaning.

SUMMARY OF THE INVENTION

The present invention relates to an automatically self-cleaning strainer assembly of the type used to separate solid particles such as solid food particles from drain water and which is capable of both high and low volume applications, such as restaurant usage.

A housing is provided which is connected to the conventional drain of a sink or the like such that incoming drain water flows into the interior of the housing. The strainer assembly includes a plurality of strainer members preferably in the form of elongated plates having one longitudinal edge pivotally attached to a carrier assembly which is maintained in continuous motion while the strainer assembly is in operation. The continuous motion is provided by an electric drive motor drivingly connected to a carrier assembly which operates not only in a continuous manner during the inflow of drain water and solid particles but also which is specifically designed and configured to travel in a continuous path as described in greater detail hereinafter.

The pivotal attachment of one longitudinal side of each of the strainer plates allows its automatic positioning from a straining position to a discarding position as the carrier assembly moves continuously during the passage of drain water therethrough. Each of the strainer plates comprise an apertured construction containing a plurality of apertures of sufficient size and disposition to allow the passage of liquid or drain water therethrough. However, the dimension and disposition of the apertures defining the aforementioned apertured construction prevents the passage of solid food particles therefrom. To the contrary, the food particles travel along with the strainer plates to a point where they are delivered to a collection facility as the strainer plates pass from the aforementioned straining position to the discarding position.

The opposite longitudinal side of each of the strainer plates relative to the pivotally attached longitudinal side thereof constitutes a free side. Therefore, each of the plates are only attached by the aforementioned pivotal connection. The carrier assembly is disposed in a horizontal orientation. Therefore, the straining position, as mentioned above, is generally defined by each of the strainer plates being disposed in a horizontal orientation, while in such straining position the free end of each plate at least minimally overlaps and is therefore supported by the next adjacent and subsequent strainer plate. The plurality of strainer plates in the straining position therefore forms a continuous apertured straining surface disposed in interruptive relation to the incoming drain water. The solid particles remain on the strainer plates while they are in the straining position, but pass off one end thereof into the collection facility for the solid particles due to a "flipping" action of each of the plates as they pass along a leading end of the carrier assembly and are automatically pivoted from the horizontally oriented straining position to the outwardly extending discarding position.

Since the particles are discarded from the exposed or straining surface of each of the straining plates by the aforementioned "flipping", each of the straining plates are effectively and automatically cleaned to ensure a non-clogging, efficient operation of the subject strainer assembly.

Viewed from another perspective, this invention fulfills the need in the art by providing an apparatus for removing solids from a mixture of solids and liquids. The apparatus includes a housing having an input port to receive the mixture of solids and liquids, a solids outlet and a drain to discharge the residue of the mixture after removal of the solids. A straining apparatus in the housing has discrete portions supported for movement in an endless path having a platform segment and a dumping segment. The platform segment is disposed to receive the incoming mixture from the port and retain solids on the portions in the platform segment while permitting the residue to travel under the influence of gravity to the drain. The dumping segment is disposed to permit solids to travel under the influence of gravity to the solids outlet. A driving means is provided for driving the discrete portions of the straining apparatus in the endless path, whereby solids in the mixture being supplied to the apparatus through the input port are directed to the solids outlet and the residue is directed to the drain.

In a preferred embodiment, the discrete portions have a leading edge pivotally joined to the driving means and an unsecured trailing edge, whereby the discrete portions are held substantially horizontal by gravity while in the platform segment and are free to pivot while in the dumping segment. The platform segment is above the dumping segment, and the discrete portions rotate through more than 180 degrees as they travel from the platform segment to the end of the dumping segment.

The apparatus preferably includes a stop supported in the housing in a position such that the discrete portions collide with the stop during rotation. The stop is resilient so that the discrete portions bounce on the stop after collision, thereby dislodging adhered solids from the discrete portions.

The driving means preferably includes a pair of parallel, laterally spaced endless members, and the discrete portions have a leading edge pivotally joined to each of the endless members. Preferably, the endless members are chains trained around longitudinally spaced sprockets. A preferred driving means includes a motor operatively engaging a sprocket.

Desirably, the housing includes an outer shell and a removable inner drawer unit containing the straining apparatus, such that the inner drawer unit may be removed from the outer shell for cleaning or servicing. In such case, the driving means may include a motor mounted on the outer shell and a drive linkage from the motor to an endless member on which the discrete portions are mounted. The drive linkage may include a first gear on the outer shell driven by the motor and a second gear on the inner drawer interengageable with the first gear and operatively associated with the endless member.

Preferably, a separator is provided between the solids outlet and the drain.

The discrete portions are preferably substantially rectangular, and may be L-shaped in cross section, with the shorter leg of the L having a pivotal connection to the drive means and the longer leg serving as the straining apparatus portion. Alternatively, the dscrete portion can be flat, and pivotally connected to link pins in the drive means.

In a one embodiment, the driving means includes spaced apart endless chains having a plurality of dogs affixed therealong and the shorter legs of the discrete portions are pivotally connected to a dog of each chain. Preferably, the endless path has a third segment substantially below the platform segment in and are washed of adhering solids by the residue.

The housing preferably includes perforated side walls at least partially surrounding the platform segment, so that accumulated solids on the discrete portions in the platform segment may be drained of water through the perforations in the side walls. More preferably, the side walls slope upwardly and outwardly from the discrete portions.

BRIEF DESCRIPTION OF THE DRAWINGS

For a fuller understanding of the nature of the present invention, reference should be had to the following detailed description taken in connection with the accompanying drawings in which:

FIG. 1 is a perspective view of a preferred embodiment of the present invention;

FIG. 2 is a schematic view illustrating the strainer assembly operation; and

FIG. 3 is a perspective view in exploded form of various components.

Like reference numerals refer to like parts throughout the several views of the drawings.

DETAILED DESCRIPTION OF A PREFERRED EMBODIMENT

As shown in FIG. 1, the subject strainer assembly is generally indicated as 10 and includes a housing comprising an outer housing shell 12 and an inner housing portion 14. The inner housing portion 14 is somewhat of a drawlike member supporting a straining mechanism generally indicated as 16 therein. The drawer or inner housing portion 14 is removably disposed on the interior of the outer housing portion 12 and may be secured in its closed position by latch mechanism 50,52. An aperture 18 is provided for interconnection to a conduit, drainpipe or the like, for the connection to in-flowing drain water mixed with solid particles, such as food particles. A drive motor 20 is secured to the outer housing 12 and may be in the form of electrically powered drive motor. Since the demands on the motor are not great, usually 1/25 horsepower motor suffices.

An outer gear member 22 connects in driving engagement with the drive shaft and a linkage member, such as a gear, attached to motor 20 for continuous rotation of the outer gear member 22 during operation of the drive motor 20. Gear 22 and the drive shaft linkage of motor 20 are readily engageable when the drawer 14 is located in position inside outer shell 12, and readily disengageable when the drawer 14 is removed. Latch mechanism 50,52 insures that drawer 14 stays in such position inside shell 12 and the gear 22 stays engaged with the drive shaft linkage.

Also as seen in FIG. 1, a separation plate 60 is provided in drawer 14, extending substantially vertically, to separate a rear water collection area under strainer 16 from the more forward solids dumping area. Separation plate 60 has a squeegee edge 61, of a material such as rubber, along it top edge to scrape adhered solids from plates passing over it: Also, a post or nub 62 is provided supported on drawer 14, in a position which will assist in knocking adhered solids from plates 24, as further discussed hereinafter. A hook 66 is provided on either side of housing 10 on which a collection facility such as a plastic bag may be hung to receive dumped solids for shipment to a landfill, compost pile, recycling center or as animal feed, or other disposition.

With reference to FIGS. 2 and 3, the strainer structure 16 is defined by a plurality of foraminous discrete portions such as strainer plates 24 each having an elongated configuration and having one longitudinal side 26 pivotally attached to a carrier assembly 54. In one embodiment, the holes in the strainer plate are 3/16 inch in diameter. Other hole sizes can be used and, in fact, the strainer plate may be made of a screen-type material. The driving means or carrier assembly 54 includes two spaced apart substantially parallel drive sprocket chains 28 connected at opposite ends to sprocket gears 30,32, each mounted on elongated interconnecting shafts 34,36, respectively. The location of the forward gears about which the discrete portions 24 are driven may be varied by altering the position of the shaft 34 on which the gears are mounted. This is accomplished by adjusting the orientation of threaded shaft 72 on the outside of the drawer 14. Such adjustment adjusts the tension on the chains trained over the gears. The outer gear 22, driven by the drive motor 20, is also mounted on shaft 36 so that it provides rotation of the sprocket gears 30,32 and connecting shafts 34,36, thereby driving the carrier assembly including the sprocket chains 28. As shown in FIGS. 2 and 3, the carrier assembly therefore forms a conveyor structure mounted in a horizontal orientation within the drawer 14 and is designed to travel continuously upon operation of the drive motor 20 in an endless path of travel.

As set forth above, opposite ends of each of the strainer plates 24 are pivotally connected as at 26 to the supporting drive chains 28. This may be accomplished by an elongated pivot shaft 39 which allows each of the plates 24 to pivot about the leading longitudinal side and the pivotal shaft 39 between a straining position and a discarding or dumping position. When in the top portion of the path, the plates 24 form a platform 56 such that the portion of the endless path may be referred to as a platform segment.

As seen in FIG. 1, drawer 14 is provided with perforated side walls 68 just above the plates 24 in the platform segment, around three sides. These side walls 68 provide raised elevations for perforations to permit water to drain in case the loading of solids on the platform becomes so great as to cover all of the apertures in the plates 24 in the platform segment from which water usually drains. Forward of walls 68 are flexible extension strips 74 which keep solids from dropping onto the gears or chains.

With reference to FIG. 2, the plates 24 are in the straining position when on the uppermost portion of the conveyor structure in a horizontal orientation as pictured. Such horizontal orientation is accomplished by a free longitudinal side 27 slightly overlapping and thereby being supported on the next adjacent and subsequent one of the strainer plates. The incoming drain water 58 having solids 42 therein fall on the platform formed by the plates 24 in the straining position. The solids are retained on plates 24 as the water and small particles which pass through the apertures in the plates continue under the influence of gravity to a conventional drain located below the housing 12, rearward of separation plate 60 (to the right in FIG. 1).

Both inner sides of drawer 14 are preferably provided with a support ledge 76 of Delrin plastic in supporting relation to the links of the chain when in the platform segment. This assures that no gaps are formed between the plate 24 and the side walls 68 through which solids could pass, regardless of the tension on the chain. As can be seen in the drawing figures, the plates 24 are substantially entirely flat.

The continuous motion of the plates in the straining position in the direction indicated by directional arrow 44 carries the plates and solids to a dumping segment of the path 46. There, each of the plates "flips" about leading end 26 as shown in FIG. 2. This flipping or turning the plate upside down dumps most of the solids from plate 24, but as the plate travels further in its free pivoting about shaft 39, it collides with post 62, imparting a jolt to the plate to dislodge adhered solids. The post is preferably of a resilient material such as rubber or neoprene so that plate 24 bounces, as at 64, to further dislodge adhered material. As the chains 28 continue to pull the plates 64, they simply slip past post 62 and are then wiped of any solids which continue to adhere by squeegee edge 61 on the separator 60, so that the solids fall to the solids outlet. Thereafter, plates 26 hang freely, substantially vertically.

As the plates 24 pass under the platform 56 in return path segment 57, the draining water washes over them, to remove small adhered bits of solids and carry them to the drain. This assures that the plates stay free of solids which would so clog the apertures as to prevent water drainage. As the plates pass around the trailing end of the conveyor system as at 47, they are forced into a pivotal movement by gravity and assume the straining position as shown while in the platform segment of the path. As can be appreciated, the four-fold cleaning of the plates—by flipping, bouncing, being squeegeed and then washed, assures that the plates cannot become clogged, permitting long uninterrupted service.

As will be apparent to those of ordinary skill in the art, the invention may take various forms beyond the specific embodiment disclosed herein.

What is claimed is:

1. An automatic self-cleaning strainer assembly for separating solid particles from drain water, said assembly comprising:
   a) a strainer structure movably mounted in receiving relation to an in-flow of drain water;
   b) housing means connected in fluid receiving relation to incoming drain water and for support of said strainer structure in interruptive relation to the drain water and having supplemental, interior, perforated side walls therein;
   c) said strainer structure comprising a plurality of strainer members each of which is free of side walls and having an apertured construction disposed and dimensioned to allow liquid to pass therethrough and prevent passage of solid particles therethrough;
   d) an endless carrier assembly including a drive motor drivingly attached thereto, said carrier assembly movably mounted within said housing means and movably supporting said plurality of strainer members along an upper platform segment and a lower dumping segment, said perforated sidewalls at least partially surrounding said upper platform segment; and
   e) said housing means, said carrier assembly and said strainer structure cooperatively structured to pass said carrier assembly and said strainer structure along a continuous path of travel within said housing and to strain liquid through said strainer members while preventing passage of solid particles therethrough.

2. An assembly as in claim 1 wherein each of said strainer members comprises a plate pivotally attached to said carrier assembly along one longitudinal side thereof and positionable upon movement of said carrier assembly between a straining position and a discarding position.

3. An assembly as in claim 2 wherein said straining position comprises said plates being disposed in a horizontal, immediate adjacent position relative to one another.

4. An assembly as in claim 3 wherein said straining position further comprises a free longitudinal side of said plate supported on a next adjacent and subsequent plate.

5. An assembly as in claim 3 wherein said discarding position is defined by a free longitudinal side of said strainer plates disposed outwardly from said one pivotally attached longitudinal side thereof.

6. As assembly as in claim 5 wherein said discarding position is defined by a downwardly depending and substantially free swinging position of said plates from said one pivotally attached longitudinal side.

7. As assembly as in claim 2 wherein said carrier assembly comprises an endless conveyor structure substantially horizontally disposed and including endless drive chains positioned in spaced, parallel relation to one another, each of said straining plates having opposite ends attached to different ones of said drive chains and extending therebetween.

8. An assembly as in claim 7 wherein said plates are disposed in said straining position when traveling along an upper portion of said conveyor assembly and in a non-straining position when traveling along an under portion thereof.

9. An assembly as in claim 8 wherein said straining position comprises said straining plates being disposed in a horizontal, immediate adjacent position relative to one another and a free longitudinal side of each of said straining plates supported on a next adjacent and subsequent straining plate.

10. An assembly as in claim 9 wherein said nonstraining position is defined by a free longitudinal side of said straining plates disposed outwardly from said one pivotally attached longitudinal side thereof and a downwardly depending and substantially free swinging position of said straining plates from said one pivotally attached longitudinal side thereof.

11. An assembly as in claim 8 wherein each of said plates are rotatable from said horizontally-oriented straining position outwardly and pivotally about said one longitudinal side thereof into said discarding position, whereby solid particles on an outer, exposed surface of each of said plates is discarded therefrom.

12. An apparatus for removing solids from a mixture of solids and liquids comprising:
a) a housing having an input port to receive the mixture of solids and liquids, a solids outlet and a drain to discharge the residue of the mixture after removal of the solids;
b) a straining apparatus in said housing having discrete portions supported for movement in an endless path having a platform segment and a dumping segment, said platform segment being disposed to receive the incoming mixture from said input pot and retain solids on said portions in said platform segment while permitting the residue to travel under the influence of gravity to said drain and said dumping segment being disposed to permit solids to travel under the influence of gravity to said solids outlet;
c) a stop supported in said housing in a position such that said discrete portions collide with said stop during pivoting, to thereby impart a jolt to said discrete portions; and
d) driving means for driving said discrete portions of said straining apparatus in said endless path,
whereby solids in the mixture being supplied to the apparatus through said input port are directed to said solids outlet and the residue is directed to said drain and
wherein said housing includes an outer shell and a removable inner drawer unit containing said straining apparatus, such that said inner drawer unit may be removed from said outer shell for clearing or servicing.

13. An apparatus as claimed in claim 12 wherein said discrete portions have a leading edge pivotally joined to said driving means and an unsecured trailing edge, whereby said discrete portions are held substantially horizontal by gravity while in said platform path segment and free to pivot while in said dumping segment.

14. An apparatus as claimed in claim 13 wherein said platform segment is above said dumping segment and said discrete portions pivot through more than 180 degrees as they travel from said platform segment to the end of said dumping segment.

15. An apparatus as claimed in claim 14 wherein said stop is resilient such that said discrete portions bounce on said stop after collision, thereby dislodging adhered solids from said discrete portions.

16. An apparatus as claimed in claim 12 wherein said driving means includes a pair of parallel, laterally spaced endless members and said discrete portions have a leading edge pivotally joined to each said endless members.

17. An apparatus as claimed in claim 16 wherein said endless members are chains trained around longitudinally spaced sprockets.

18. An apparatus as claimed in claim 17 wherein said driving means includes a motor operatively engaging said sprockets.

19. An apparatus as claimed in claim 12 wherein said driving means includes a motor mounted on said outer shell and a drive linkage from said motor to an endless member on which said discrete portions are mounted.

20. An apparatus as claimed in claim 19 wherein said drive linkage includes a first gear on said outer shell driven by said motor and a second gear on said inner drawer interengageable with said first gear and operatively associated with said endless member.

21. An apparatus as claimed by claim 12 further comprising a separator between said solids outlet and said drain.

22. An apparatus as claimed in claim 12 wherein said discrete portions are substantially rectangular.

23. An apparatus as claimed in claim 12 wherein said discrete portions are L-shaped in cross section, with the shorter leg of the L having a pivotal connection to said drive means and the longer leg serving as the straining apparatus portion.

24. An apparatus as claimed in claim 23 wherein said driving means includes spaced apart endless chains having a plurality of dogs affixed therealong and said shorter legs of said discrete portions are pivotally connected to a dog of each chain.

25. An apparatus as claimed in claim 12 wherein said path has a third segment substantially below said platform segment in which discrete portions hang substantially vertically and are washed of adhering solids by the residue.

26. An apparatus for removing solids from a mixture of solids and liquids comprising:
a) a housing having an input port to receive the mixture of solids and liquids, a solids outlet and a drain to receive the residue of the mixture after removal of the solids wherein said housing includes an outer shell and a removable inner drawer unit, such that said inner drawer unit may be removed from said outer shell for cleaning and servicing;
b) a straining apparatus in said drawer unit having substantially rectangular discrete portions supported for movement in an endless path having a platform segment and a dumping segment, said discrete portions having a leading edge pivotally joined to a driving means in said drawer unit and an unsecured trailing edge, whereby said discrete portions are held substantially horizontal by gravity while in said platform segment and free to pivot while in said dumping segment wherein said discrete portions are L-shaped in cross section, with the shorter leg of the L having a pivotal connection to said driving means and the longer leg serving as the straining apparatus portion wherein said endless path has a third segment substantially below said platform segment in which said discrete portions hang substantially vertically and are washed of adhering solids by the residue;

c) said platform segment being disposed to receive the incoming mixture from said port and retain solids on said portions in said platform segment while permitting the residue to travel under the influence of gravity to said drain and said dumping segment being disposed to permit solids to travel under the influence of gravity to said solids outlet wherein said platform segment is above said dumping segment and said discrete portions pivot through more than 180 degrees as they travel from said platform segment to the end of said dumping segment;

d) wherein said driving means includes a pair of parallel, laterally spaced endless chains having a plurality of dogs affixed therealong and said shorter portions of said discrete portions have a leading edge pivotally joined to a dog of each said chain, said chains are trained around longitudinally spaced sprockets mounted in said drawer, a motor is mounted on said outer shell, a first gear is mounted on said outer shell driven by said motor and a second gear on said inner drawer is interengageable with said first gear to transmit motion from said first gear to said chains;

e) a resilient stop supported in said housing in a position such that said discrete portions collide with said stop during pivoting such that said discrete portions bounce on said stop after collision, thereby dislodging adhered solids from said discrete portions;

f) a separator in said housing between said solids outlet and said drain;

g) said housing including perforated side walls at least partially surrounding said platform segment and sloping upwardly and outwardly therefrom;

whereby solids in the mixture being supplied to the apparatus through said input port are directed to said solids outlet and the residue is directed to said drain.

27. An apparatus for removing solids from a mixture of solids and liquids comprising:
a) a housing having an input port to receive the mixture of solids and liquids, a solids outlet, a drain to discharge the residue of the mixture after removal of the solids and supports therein;
b) a straining apparatus in said housing having discrete straining portions pivotally supported on said supports for movement in an endless path having a platform segment and a dumping segment, said platform segment being disposed to receive the incoming mixture from said input port and retain solids on said portions in said platform segment while permitting the residue to travel under the influence of gravity to said drain and said dumping segment being disposed to permit pivoting of said discrete portions and thereby permit solids to travel under the influence of gravity to said solids outlet;
c) a stop supported in said housing in a position such that said discrete portions collide with said stop during pivoting, to thereby impart a jolt to said discrete impart a jolt to said discrete portions; and
d) driving means for driving said discrete portions of said straining apparatus in said endless path over said supports whereby solids in the mixture being supplied to the apparatus through said input port are directed to said solids outlet and the residue is directed to said drain; and
e) wherein said housing includes supplemental, interior, perforated side walls at least partially surrounding said platform segment, whereby accumulated solids on said discrete portions in said platform segment may be drained of water through the perforations in said side walls.

28. An apparatus as claimed in claim 27 wherein said side walls slope upwardly and outwardly from said discrete portions in said platform segment.

29. An apparatus for removing solids from a mixture of solids and liquids comprising:
a) a housing having an input port to receive the mixture of solids and liquids, a solids outlet, a drain to discharge the residue of the mixture after removal of the solids and supports therein;
b) a straining apparatus in said housing having discrete straining portions pivotally supported on said supports for movement in an endless path having a platform segment and a dumping segment, said platform segment being disposed to receive the incoming mixture from said input port and retain solids on said portions in said platform segment while permitting the residue to travel under the influence of gravity to said drain and said dumping segment being disposed to permit pivoting of said discrete portions and thereby permit solids to travel under the influence of gravity to said solids outlet;
c) a stop supported in said housing in a position such that said discrete portions collide with said stop during pivoting, to thereby impart a jolt to said discrete portions;
d) a scraper positioned in said housing in a position to scrape still-adhered solids from said discrete portions after collision with said stop; and
e) driving means for driving said discrete portions of said straining apparatus in said endless path over said supports,
whereby solids in the mixture being supplied to the apparatus through said input port are directed to said solids outlet and the residue is directed to said drain.

30. An apparatus for removing solids from a mixture of solids and liquids comprising:
a) a housing having an input port to receive the mixture of solids and liquids, a solids outlet, a drain to discharge the residue of the mixture after removal of the solids, supplemental, interior, perforated side walls and supports therein;
b) a straining apparatus in said housing having discrete straining portions pivotally supported on said supports for movement in an endless path having a platform segment and a dumping segment, said perforated sidewalls at least partially surrounding said platform segment, said platform segment being disposed to receive the incoming mixture from said input port and retain solids on said portions in said platform segment while permitting the residue to travel under the influence of gravity to said drain and said dumping segment being disposed to permit pivoting of said discrete portions and thereby permit solids to travel under the influence of gravity to said solids outlet;

c) a stop supported in said housing in a position such that said discrete portions collide with said stop during pivoting, to thereby impart a jolt to said discrete portions;

d) hooks on either side of said housing adapted to support a solids collection container in a position to collect solids from said solids outlet; and e) driving means for driving said discrete portions of said straining apparatus in said endless path over said supports, whereby solids in the mixture being supplied to the apparatus through said input port are directed to said solids outlet for collection in a solids collection container supported on said supports and the residue is directed to a solids collection container supported on said housing through said solids outlet and the residue is directed to said drain.

* * * * *